United States Patent
Kim

(10) Patent No.: US 11,855,311 B2
(45) Date of Patent: Dec. 26, 2023

(54) ELECTROLYTE MEMBRANE FOR FUEL CELL HAVING IMPROVED ION CHANNEL CONTINUITY AND METHOD OF MANUFACTURING SAME

(71) Applicants: Hyundai Motor Company, Seoul (KR); Kia Motors Corporation, Seoul (KR)

(72) Inventor: Byoungsu Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 534 days.

(21) Appl. No.: 16/997,397

(22) Filed: Aug. 19, 2020

(65) Prior Publication Data

US 2021/0075032 A1    Mar. 11, 2021

(30) Foreign Application Priority Data

Sep. 6, 2019   (KR) .......................... 10-2019-0110439

(51) Int. Cl.
| | |
|---|---|
| *H01M 8/0258* | (2016.01) |
| *H01M 8/0245* | (2016.01) |
| *H01M 8/1004* | (2016.01) |
| *H01M 8/1058* | (2016.01) |
| *H01M 8/1018* | (2016.01) |

(52) U.S. Cl.
CPC ....... *H01M 8/0258* (2013.01); *H01M 8/0245* (2013.01); *H01M 8/1004* (2013.01); *H01M 8/1018* (2013.01); *H01M 8/1058* (2013.01)

(58) Field of Classification Search
CPC ............. H01M 8/0258; H01M 8/0245; H01M 8/1004; H01M 8/1018; H01M 8/1058
See application file for complete search history.

(56) References Cited

U.S. PATENT DOCUMENTS

2006/0057281 A1 *  3/2006  Izumi ..................... H01M 4/92
                                                            429/535

FOREIGN PATENT DOCUMENTS

| | | | | | |
|---|---|---|---|---|---|
| CN | 103460467 | A | * | 12/2013 | ............ H01M 12/02 |
| CN | 104051744 | A | * | 9/2014 | .......... H01M 4/8668 |
| JP | 4897206 | B2 | | 3/2012 | |
| JP | 2017-224607 | A | | 12/2017 | |
| KR | 10-2007-0098157 | A | | 10/2007 | |
| KR | 10-2014-0085885 | A | | 7/2014 | |
| KR | 10-1639536 | B1 | | 7/2016 | |
| KR | 10-2017-0091108 | A | | 8/2017 | |
| KR | 101830291 | B1 | * | 2/2018 | .......... H01M 8/1004 |
| KR | 2020027626 | A | * | 3/2020 | .......... H01M 8/1051 |
| WO | WO-2013064640 | A1 | * | 5/2013 | ............ H01M 4/881 |

* cited by examiner

*Primary Examiner* — Amanda C. Walke
(74) *Attorney, Agent, or Firm* — Fox Rothschild LLP

(57) ABSTRACT

Disclosed are an electrolyte membrane and a method of manufacturing the same. The electrolyte membrane, in which the continuity of a channel through which protons move is improved, may include ionomer solutions having different viscosities and a porous support having pores therein.

17 Claims, 4 Drawing Sheets

ELECTROLYTE MEMBRANE FOR FUEL CELL HAVING IMPROVED ION CHANNEL CONTINUITY AND METHOD OF MANUFACTURING SAME

CROSS REFERENCE TO RELATED APPLICATION

The present application claims priority based on Korean Patent Application No. 10-2019-0110439, filed on Sep. 6, 2019, the entire content of which is incorporated herein for all purposes by this reference.

TECHNICAL FIELD

The present invention relates to an electrolyte membrane for a fuel cell and a method of manufacturing the same. The electrolyte membrane, in which the continuity of a channel through which protons move is improved, may include ionomer solutions having different viscosities and a porous support having pores therein.

BACKGROUND

The electrolyte membrane, e.g., including Nafion, for a fuel cell is actually configured to transport protons in the fuel cell. In recent years, effort has been made to develop a reinforced membrane in which, for example, a porous support, which is thermally and mechanically stable, is impregnated with an ionomer. In the case of the reinforced membrane, it is difficult to completely impregnate the pores in the reinforced membrane with the ionomer in order to form a continuous proton transport passage.

For example, ionomers are injected several times in various ways into the pores formed in opposite surfaces of the porous support. As such, air can be introduced into the pores along with the ionomer injected at individual steps, or the air remaining inside does not completely escape, and air is left behind in the form of bubbles in the porous support.

SUMMARY

In one preferred aspect, provided is, inter alia, a method of suppressing the formation of bubbles in pores included in a porous support.

In one preferred aspect, provided is an electrolyte membrane having increased proton conductivity.

The objectives of the present invention are not limited to the foregoing, and will be able to be clearly understood through the following description and to be realized by the means described in the claims and combinations thereof.

In an aspect, provided is an electrolyte membrane for a fuel cell. The electrolyte membrane may include: a porous support including pores, a first ionomer layer including a first ionomer solution penetrating into the pores from a first surface of the porous support, and a second ionomer layer including a second ionomer solution penetrating into the pores from a second surface of the porous support opposite the first surface. Preferably, a viscosity of the first ionomer solution is different from a viscosity of the second ionomer solution.

The "porous support" or "porous substrate" as used herein refers to a porous material that includes plurality of shapes of pores (e.g., circular, or non-circular), holes, cavity (e.g., microcavity), labyrinth, channel or the like, whether formed uniformly or without regularity. Exemplary porous substrate may include pores (e.g., closed or open pores) within a predetermined size within a range from sub-micrometer to micrometer size, which is measured by maximum diameter of the pores.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a polytetrafluoroethylene-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

A first ionomer in the first ionomer solution and a secondary ionomer in the second ionomer solution may be the same or different type. In certain aspect, the first and second ionomers are different, these ionomers are different in physical or chemical properties such as polydispersity index (PDI). For example, the first ionomer has the PDI value different from the PDI value of the second ionomer by at least 5, 10, 20, 25, 30, 35, 40, 45, 60, 70, 80 or 90%.

The viscosity of the first ionomer solution may be greater than the viscosity of the second ionomer solution, the first ionomer layer may be formed by impregnating the first surface of the porous support with the first ionomer solution, and the second ionomer layer may be formed by impregnating the second surface of the porous support with the second ionomer solution.

The first ionomer layer may be formed to occupy a portion of the pores from the first surface of the porous support, and the second ionomer layer may be formed to occupy a portion of the pores from the second surface of the porous support.

In one aspect, the difference between the viscosity of the first ionomer solution and the viscosity of the second ionomer solution may be about 10 cP to 490 cP, or the difference in viscosity of the first ionomer solution and the second ionomer solution may be up to or at least to 10 cP, 20 cP, 30 cP, 40 cP, 50 cP, 10 cP, 150 cP, 200 cp, 250 cP, 300 cP, 350 cP, 400 cP or 450 cP.

In certain aspects, the viscosity of the first ionomer solution may be about 100 to 500 cP, and the viscosity of the second ionomer solution may be about 10 to 90 cP.

As referred to herein, viscosities of the first ionomer solution and the second ionomer solution (and differences between those viscosities) are determined at the same temperature such as 25° C. or 40° C., preferably 25° C.

In an aspect, provided is a method of manufacturing an electrolyte membrane for a fuel cell. The method may include: preparing a porous support including pores; preparing a first ionomer solution; preparing a second ionomer solution; primarily impregnating the pores in the porous support with the first ionomer solution; and secondarily impregnating the pores in the porous support with the second ionomer solution. Preferably, a viscosity of the first ionomer solution is different from a viscosity of the second ionomer solution.

The viscosity of the first ionomer solution may be greater than the viscosity of the second ionomer solution.

The primarily impregnating may include impregnating a first surface of the porous support with the first ionomer solution, and the secondarily impregnating may include impregnating a second surface of the porous support with the second ionomer solution.

The primarily impregnating may include applying the first ionomer solution on a substrate, laminating the first surface of the porous support with the first ionomer solution applied on the substrate to form a first ionomer coating layer on the first surface of the porous support, and impregnating the pores in the first surface of the porous support with the first ionomer solution.

In the primarily impregnating, a portion of the pores in the porous support may be impregnated with the first ionomer solution, and in the secondarily impregnating, a remaining portion of the pores in the porous support not impregnated with the first ionomer solution may be impregnated with the second ionomer solution.

In certain aspects, the viscosity of the first ionomer solution may be about 100 to 500 cP, and the viscosity of the second ionomer solution may be about 10 to 90 cP.

In certain aspects, the difference between the viscosity of the first ionomer solution and the viscosity of the second ionomer solution may be about 10 cP to 490 cP.

The volume of the pores in the porous support may be identical to the total volume of the first ionomer solution and the second ionomer solution incorporated into the pores.

In the primarily impregnating, a portion of the pores in the porous support may be impregnated with the first ionomer solution, and in the secondarily impregnating, a remaining portion of the pores in the porous support not impregnated with the first ionomer solution may be impregnated with the second ionomer solution.

The method may further include coating the porous support with the first ionomer solution after the primarily impregnating and the secondarily impregnating.

Alternatively, the primarily impregnating may include applying the first ionomer solution on a substrate, laminating a first surface of the porous support with the first ionomer solution applied on the substrate to form a first ionomer coating layer on the first surface of the porous support, and impregnating the pores in the first surface of the porous support with the first ionomer solution, and the secondarily impregnating may include applying the second ionomer solution on a second surface of the porous support opposite the first surface to form a second ionomer coating layer on the second surface of the porous support, and impregnating the pores in the second surface of the porous support with the second ionomer solution.

Also provided herein is a fuel cell including the electrode membrane as described herein.

According to various exemplary embodiments of the present invention, proton conductivity in the electrolyte membrane can be effectively increased. Further, the discontinuity of the ionomer serving as a proton channel in the porous support can be reduced. Moreover, deformation of the electrolyte membrane can be suppressed, thus ensuring durability.

The effects of the present invention are not limited to the foregoing, and should be understood to include all effects that can be reasonably anticipated from the following description.

Other aspects of the invention are disclosed infra.

DETAILED DESCRIPTION

Figure 1:
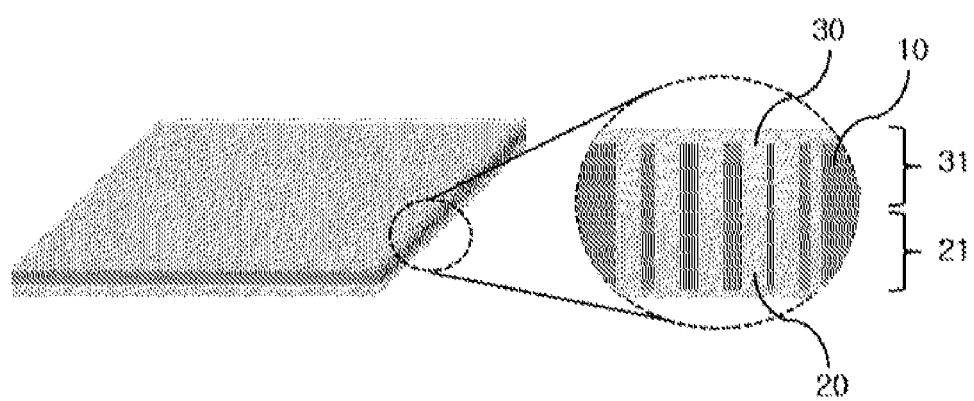
FIG. 1 shows an exemplary electrolyte membrane according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present invention pertains to an electrolyte membrane for a fuel cell and a method of manufacturing the same. Here, the electrolyte membrane for a fuel cell, which is a product invention, and the method of manufacturing the electrolyte membrane for a fuel cell, which is a method invention, will be described below.

Electrolyte Membrane for Fuel Cell

In an aspect, the electrolyte membrane for a fuel cell may include a porous support including pores therein, a first ionomer layer including a first ionomer solution that penetrates into the pores in the porous support from a first surface of the porous support, and a second ionomer layer including a second ionomer solution that penetrates into the pores in the porous support from a second surface of the porous support opposite the first surface. The viscosities of the first ionomer solution and the second ionomer solution are different from each other.

The first surface of the porous support is a bottom side of the porous support, and the second surface of the porous support is a top side of the porous support.

The porous support may be configured to support an electrolyte membrane and a membrane-electrode assembly, and may function as a passage for transporting protons from the anode provided on the first surface of the electrolyte membrane to the cathode provided on the second surface of the electrolyte membrane through the ionomer included in the pores inside. The first surface and the second surface are facing opposite directions.

The porous support may be used without particular limitation, so long as it has pores therein and is able to sufficiently perform the supporting function. The porous support may include expanded polytetrafluoroethylene (e-PTFE).

The internal porosity of the porous support may range from about 5 to about 90%, but the present invention does not particularly limit the thickness of the porous support.

The porous support may be preferably configured such that pores connect the first surface of the porous support to the second surface thereof and thus perforate through the porous support. As such, when the connectivity between the pores in the porous support is insufficient, the ionomer loaded in the pores may not be discontinuous, and consequently the proton conductivity may not decrease.

The electrolyte membrane may include the porous support and the ionomer. For example, the electrolyte membrane may have a structure in which the pores in the porous support are impregnated with ionomer solutions. The ionomer solutions may suitably include two or more ionomer solutions having different viscosities.

The ionomer may be used without particular limitation, so long as it is useful in the field of fuel cells, and preferably includes a perfluorinated sulfonic acid (PFSA) ionomer.

In particular, the two or more ionomers may be of the same type, and differ only in viscosity. As such, a phenomenon, by which proton conductivity is lowered due to the interface between the ionomer solutions when the pores in the porous support are filled with two or more ionomer solutions having different viscosities, may be prevented.

The ionomer solution may include an ionomer and a solvent and the solvent my include any one selected from the group consisting of water, alcohol and combinations thereof.

The viscosity of the ionomer solution u may be controlled by adjusting the ratio of the ionomer and the solvent. In an ionomer solution having high viscosity, the amount of the ionomer is greater than that of the solvent. If an ionomer solution having low viscosity, the amount of the ionomer is less than that of the solvent.

Moreover, the viscosity of the ionomer solution may vary depending on the equivalent weight (EW) and molecular weight (MW) of the ionomer. In particular, the viscosity may be increased when the equivalent weight of the ionomer is low or the molecular weight thereof is high. For example, the viscosity may be inversely proportional to the equivalent weight of the ionomer and proportional to the molecular weight of the ionomer. Because of the increased number of $—SO_3$ groups in the ionomer, the interaction with the solvent increases, resulting in immobilization of solvent molecules.

The ionomer solution having high viscosity as used herein is referred to as a first ionomer solution, and the ionomer solution having low viscosity as used herein is referred to as a second ionomer solution.

The difference between the viscosity of the first ionomer solution and the viscosity of the second ionomer solution may be about 10 cP to 490 cP. Here, when the difference in viscosity is less than about 10 cP, the viscosity of the first ionomer solution may be excessively dilute, so that impregnation of the pores in the porous support does not proceed efficiently, or the state of impregnation may not be properly maintained after impregnation, which is undesirable. Moreover, the pores in the porous support may not be easily impregnated with the second ionomer solution due to the high viscosity of the second ionomer solution. On the other hand, when the difference in viscosity is greater than about 490 cP, the viscosity of the first ionomer solution may be excessively high, making it impossible to impregnate the pores in the porous support. Moreover, since the viscosity of the second ionomer solution becomes low, the ionomer layer or the ionomer coating layer may not be formed after the pores in the porous support are impregnated, or economic benefits may be negated due to the long processing time.

The viscosity of the first ionomer solution may suitably be about 100 to 500 cP, and the viscosity of the second ionomer solution may suitably be about 10 to 90 cP.

The first ionomer solution having a high viscosity penetrates into the bottom side surface of the porous support, and the second ionomer solution having a low viscosity penetrates into the top side surface of the porous support.

FIG. 1 shows the electrolyte membrane according to an exemplary embodiment of the present invention. theretofore example, a porous support 10 may be impregnated with a first ionomer solution 20 and a second ionomer solution 30 through pores therein. The first ionomer solution 20 and the second ionomer solution 30 may not mix with each other, but rather form layers in the porous support 10.

The electrolyte membrane may include a first ionomer layer 21 formed through impregnation with the first ionomer solution 20 and a second ionomer layer 31 formed through impregnation with the second ionomer solution 30, the first ionomer layer 21 and the second ionomer layer 31 being formed so as to be in contact with each other through the pores 11 in the porous support 10.

The bottom of the porous support (e.g., a first surface of the porous support) may be impregnated with the first ionomer solution to form the first ionomer layer, and the top of the porous support (e.g., a second surface of the porous support) may be impregnated with the second ionomer solution to form the second ionomer layer. For example, the first ionomer layer 21 may be formed to occupy a portion of the pores 11 from the first surface of the porous support 10, and the second ionomer layer 31 may be formed to occupy a portion of the pores 11 from the second surface of the porous support 10 opposite the first surface, in which the first ionomer layer 21 and the second ionomer layer 31 loaded in the pores 11 contain no bubbles.

Ultimately, the volume of the pores 11 in the porous support 10 may be the same as the total volume of the first ionomer solution and the second ionomer solution incorporated into the pores.

Moreover, both surfaces of the porous support 10 impregnated with the first ionomer solution 20 and the second ionomer solution 30 may be coated with the first ionomer solution 20 and the second ionomer solution 30 to form coating layers. For example, the ionomer solution included in the electrolyte membrane o may be present in the pores 11 in the porous support 10, and may also be present on the surface of the porous support 10.

Figure 2:
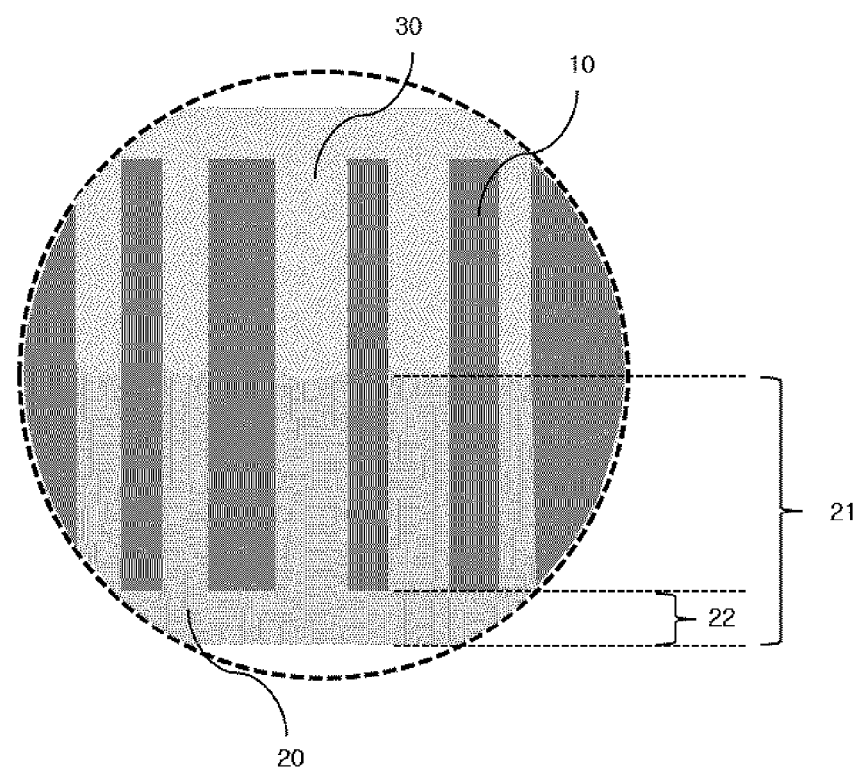
FIG. 2 shows a part of a cross-section of an exemplary electrolyte membrane according to an exemplary embodiment of the present invention.

As shown in FIG. 2, a portion of the first ionomer solution 20 may be incorporated into the pores in the porous support 10, and the remaining portion thereof may remain on the surface of the porous support 10 to form a layer. The above layer is referred to as a first ionomer coating layer 22, and the coating layer formed by the second ionomer solution is referred to as a second ionomer coating layer.

The first ionomer coating layer and the second ionomer coating layer may be excluded depending on the end use.

Figure 3:
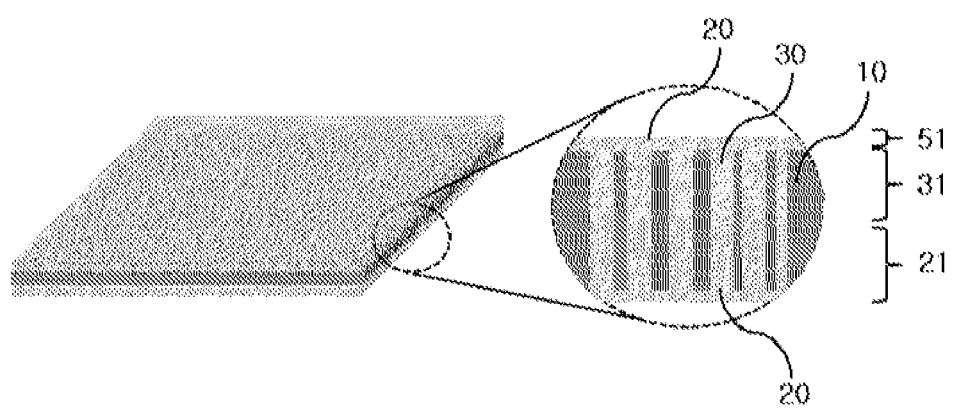
FIG. 3 shows an exemplary electrolyte membrane according to an exemplary embodiment of the present invention.

The first ionomer solution 20 may be applied onto the surface of the second ionomer layer 31 to form a third ionomer layer 51. The resulting electrolyte membrane is illustrated in FIG. 3. For example, the first ionomer solution 20, having high viscosity, may be applied onto the second ionomer layer 31 formed of the second ionomer solution 30, having low viscosity, to afford the third ionomer layer 51. This process may be optionally performed for the purposes of controlling the thickness of the electrolyte membrane and increasing processing efficiency.

Method of Manufacturing Electrolyte Membrane for Fuel Cell

In an aspect, the method of manufacturing the electrolyte membrane for a fuel cell may include: preparing a porous support including pores, preparing a first ionomer solution; preparing a second ionomer solution; and impregnating the pores in the porous support with the first ionomer solution and the second ionomer solution.

The porous support, the first ionomer solution and the second ionomer solution are as described above when describing the electrolyte membrane for a fuel cell, and thus descriptions overlapping already described content will be omitted.

Preparation of Porous Support

The porous support, which serves as a support, a skeleton and a proton transport passage for the electrolyte membrane and a membrane-electrode assembly, preferably may include expanded polytetrafluoroethylene (e-PTFE) having pores therein.

Preparation of First Ionomer Solution

The first ionomer solution, which is the ionomer solution with which pores in the porous support are first impregnated, may be prepared, and the first ionomer solution may include a first ionomer and a first solvent. Here, the first solvent may suitably include any one selected from the group consisting of water, alcohol and combinations thereof.

The viscosity of the first ionomer solution may be about 100 to 500 cP, or particularly about 100 to 250 cP. When the viscosity of the first ionomer solution is less than about 100 cP, impregnation of the pores in the porous support with the first ionomer solution may not proceed properly, or it may be difficult to form a first ionomer coating layer 22 having a desired thickness after impregnation. On the other hand, when the viscosity of the first ionomer solution is greater than about 500 cP, the first ionomer solution may not fully penetrate into the pores in the porous support such that it is impossible to impregnate the inside of the support with the first ionomer solution.

Preparation of Second Ionomer Solution

After a portion of the pores in the porous support is impregnated with the first ionomer solution, a second ionomer solution, which is the ionomer solution that is incorporated into the remaining portion of the pores not impregnated with the first ionomer solution, may be prepared.

The second ionomer solution may include a second ionomer and a second solvent, like the first ionomer solution, and the second ionomer may be preferably the same kind as the first ionomer included in the first ionomer solution. However, the second ionomer solution may be characterized by having low viscosity compared to the first ionomer solution, and the viscosity may be controlled by adjusting the amounts of the second ionomer and the second solvent. The viscosity of the second ionomer solution may be about 10 to 90 cP. When the viscosity of the second ionomer solution is less than about 10 cP, the solution may be excessively dilute, and thus the ionomer layer or ionomer coating layer may not be formed as desired, or bubbles may form in the pores in the porous support after drying. On the other hand, when the viscosity of the second ionomer solution is greater than about 90 cP, impregnation of the pores in the porous support therewith may not proceed properly.

Impregnation

The porous support prepared above may be impregnated with the first ionomer solution and the second ionomer solution.

The impregnation may include: primarily impregnating the porous support 10 with the first ionomer solution 20 and secondarily impregnating the porous support 10 with the second ionomer solution 30.

Figure 4:
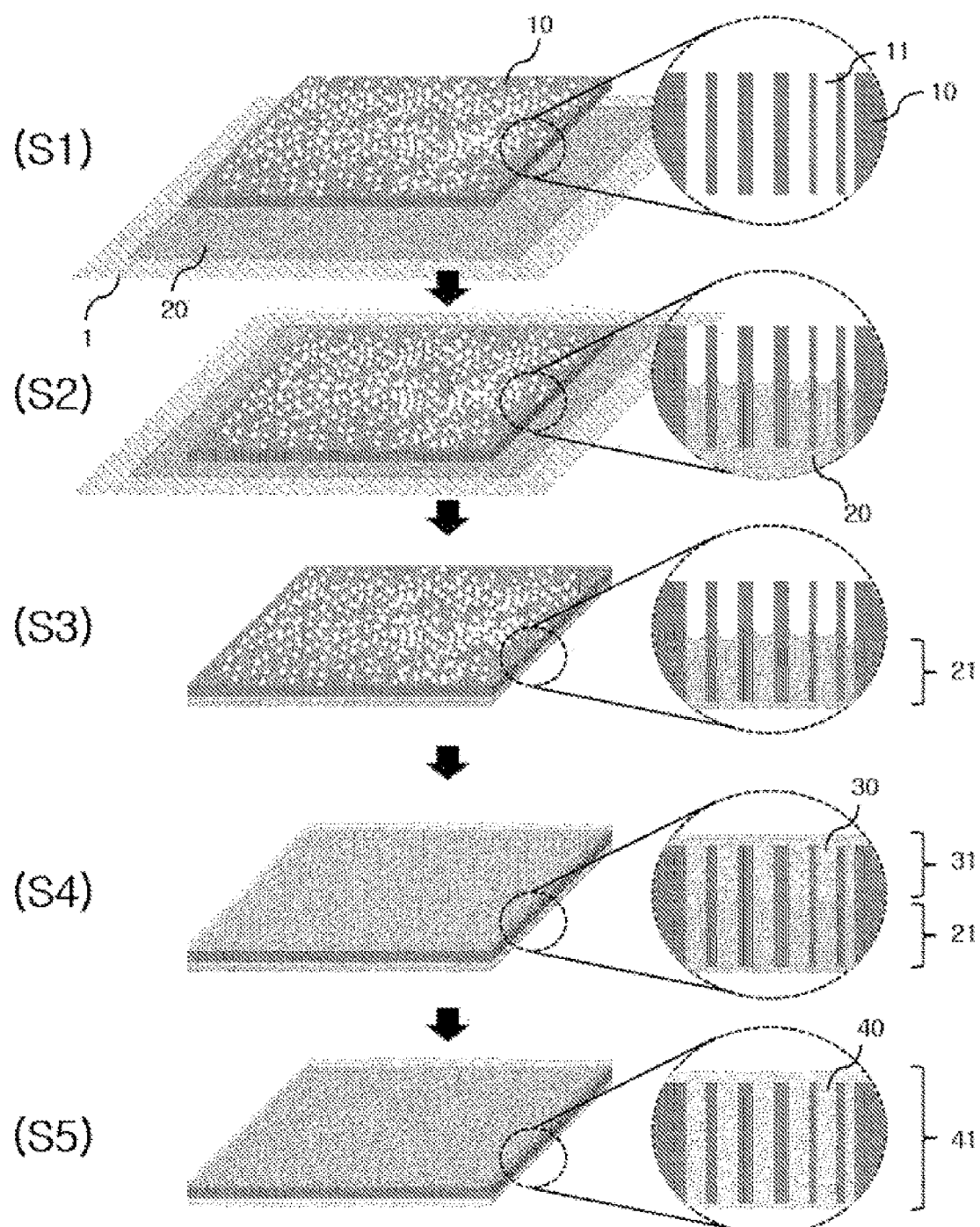
FIG. 4 shows an exemplary process of manufacturing an exemplary electrolyte membrane according to an exemplary embodiment of the present invention.

FIG. 4 shows an exemplary impregnation process for impregnating an exemplary porous support with an exemplary ionomer solution. For example, S1 is a step of preparing the porous support 10 to be impregnated with the first ionomer solution 20, in which the first ionomer solution 20 may be prepared by applying the first ionomer solution 20 on a substrate 1. The porous support 10 thus prepared includes pores 11 therein, and particularly, the porous support 10 may include pores 11 perforating the porous support 10 from the first surface thereof to the second surface thereof.

The impregnation with the first ionomer solution may be carried out by directly applying the first ionomer solution 20 on the porous support 10 or by applying the first ionomer solution 20 on the prepared substrate 1 and then laminating the porous support 10 with the surface of the substrate 1 on which the first ionomer solution 20 is applied.

The latter impregnation process is shown in FIG. 4. For example, S2 to S4 are steps of impregnating the porous support 10 with the first ionomer solution 20 and the second ionomer solution 30, and particularly include primarily impregnating the bottom of the porous support 10 with the first ionomer solution and secondarily impregnating the top of the porous support 10 with the second ionomer solution.

S2 and S3 correspond to the primary impregnation of the present invention. For example, S2 is laminating the prepared porous support 10 with the surface of the substrate 1 on which the first ionomer solution 20 is applied, in which a portion of the pores 11 in the porous support 10 is impregnated with the first ionomer solution 20 applied on the substrate 1. S3 is separating the substrate 1 from the first surface of the porous support 10 after sufficient impregnation with the first ionomer solution 20.

The first ionomer solution 20 may be left behind not only in the pores 11 in the porous support 10 but also on the surface thereof. For example, the first ionomer solution 20 may be applied on the first surface of the porous support 10, whereby a portion thereof may remain on the first surface of the porous support 10 to form a first ionomer coating layer and the remaining portion thereof may penetrate into the pores 11 in the porous support 10 to impregnate the porous support.

S4 corresponds to the secondary impregnation. For example, S4 may be completely impregnating the remaining portion of the pores 11 in the porous support 10, not impregnated with the first ionomer solution 20, with the second ionomer solution 30. Particularly, the surface of the porous support 10 not impregnated with the first ionomer solution 20 may be directly coated and thus impregnated with the second ionomer solution 30. Since the second ionomer solution 30 has low viscosity, the pores 11 in the porous support 10 may be easily impregnated and filled therewith due to gravity. As such, when the pores 11 are impregnated with the second ionomer solution 30, the second ionomer solution 30 comes into contact with the first ionomer solution 20 already incorporated into the pores 11. Accordingly, all of the pores 11 in the porous support 10 may be filled, without leaving voids (bubbles) through the pores 11 formed in opposite surfaces of the porous support 10 using the first ionomer solution 20 and the second ionomer solution 30.

According to various exemplary embodiments of the present invention, viscosity of the second ionomer solution 30 may be less than the viscosity of the first ionomer solution 20. When the second ionomer solution 30 has high viscosity, like the first ionomer solution 20, the pressure of the remaining pores 11 in the porous support 10 may excessively increase, making it impossible to completely impregnate the pores 11 in the porous support 10 with the second ionomer solution 30.

A portion of the second ionomer solution 30 may be used for impregnation, and the remaining portion thereof may remain or be left behind on the surface of the porous support 10, thus forming a second ionomer coating layer.

Since the viscosity of the second ionomer solution 30 is low, the second ionomer coating layer cannot be formed to an appropriate thickness. As such, forming a third ionomer layer by applying the first ionomer solution 10 having high viscosity once more on the second ionomer coating layer or the second ionomer layer may be further performed.

The coating step of forming the third ionomer layer may be performed in order to increase processing efficiency, and thus may be excluded as necessary.

S5 is a step of drying an electrolyte membrane including the porous support 10, the first ionomer solution 20 and the second ionomer solution 30. Through the drying process, the solvent may be removed from the first ionomer solution 20 and the second ionomer solution 30. Since the kinds of ionomers remaining in the first ionomer solution 20 and the second ionomer solution 30 are the same, it is possible to form a dried ionomer layer 41 including a continuous proton channel containing a single kind of ionomer 40 that perforates through all surfaces of the electrolyte membrane.

Although the various exemplary embodiments of the present invention have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present invention.

What is claimed is:

1. An electrolyte membrane, comprising:
   a porous support comprising pores;
   a first ionomer layer comprising a first ionomer solution penetrating into the pores from a first surface of the porous support; and
   a second ionomer layer comprising a second ionomer solution penetrating into the pores from a second surface of the porous support opposite the first surface,
   wherein a viscosity of the first ionomer solution is different from a viscosity of the second ionomer solution, and a difference between the viscosity of the first ionomer solution and the viscosity of the second ionomer solution is about 10 cP to 490 cP.

2. The electrolyte membrane of claim 1, wherein the viscosity of the first ionomer solution is greater than the viscosity of the second ionomer solution,
   the first ionomer layer is formed by impregnating the first surface of the porous support with the first ionomer solution, and
   the second ionomer layer is formed by impregnating the second surface of the porous support with the second ionomer solution.

3. The electrolyte membrane of claim 2, wherein the first surface of the porous support is a bottom side of the porous support, and
   the second surface of the porous support is a top side of the porous support.

4. The electrolyte membrane of claim 1, wherein the first ionomer layer is formed to occupy a portion of the pores from the first surface of the porous support, and
   the second ionomer layer is formed to occupy a portion of the pores from the second surface of the porous support.

5. The electrolyte membrane of claim 1, wherein the viscosity of the first ionomer solution is about 100 to 500 cP, and the viscosity of the second ionomer solution is about 10 to 90 cP.

6. A method of manufacturing an electrolyte membrane, comprising:
   preparing a porous support comprising pores;
   preparing a first ionomer solution;
   preparing a second ionomer solution;
   primarily impregnating at least a portion the pores in the porous support with the first ionomer solution; and secondarily impregnating at least a portion of the pores in the porous support with the second ionomer solution,
wherein a viscosity of the first ionomer solution is different from a viscosity of the second ionomer solution.

7. The method of claim 6, wherein the viscosity of the first ionomer solution is greater than the viscosity of the second ionomer solution.

8. The method of claim 6, wherein the primarily impregnating comprises impregnating a first surface of the porous support with the first ionomer solution, and
the secondarily impregnating comprises impregnating a second surface of the porous support with the second ionomer solution.

9. The method of claim 6, wherein the primarily impregnating comprises applying the first ionomer solution on a substrate, laminating a first surface of the porous support with the first ionomer solution applied on the substrate to form a first ionomer coating layer on the first surface of the porous support, and impregnating the pores in the first surface of the porous support with the first ionomer solution.

10. The method of claim 6, wherein, in the primarily impregnating, a portion of the pores in the porous support is impregnated with the first ionomer solution, and in the secondarily impregnating, a remaining portion of the pores in the porous support not impregnated with the first ionomer solution is impregnated with the second ionomer solution.

11. The method of claim 6, wherein the viscosity of the first ionomer solution is about 100 to 500 cP, and the viscosity of the second ionomer solution is about 10 to 90 cP.

12. The method of claim 6, wherein a difference between the viscosity of the first ionomer solution and the viscosity of the second ionomer solution is about 10 cP to 490 cP.

13. The method of claim 6, wherein a volume of the pores in the porous support is identical to a total volume of the first ionomer solution and the second ionomer solution incorporated into the pores.

14. The method of claim 6, further comprising coating the porous support with the first ionomer solution after the primarily impregnating and the secondarily impregnating.

15. The method of claim 6, wherein the primarily impregnating comprises applying the first ionomer solution on a substrate, laminating a first surface of the porous support with the first ionomer solution applied on the substrate to form a first ionomer coating layer on the first surface of the porous support, and impregnating the pores in the first surface of the porous support with the first ionomer solution, and
the secondarily impregnating comprises applying the second ionomer solution on a second surface of the porous support opposite the first surface to form a second ionomer coating layer on the second surface of the porous support, and impregnating the pores in the second surface of the porous support with the second ionomer solution.

16. A fuel cell comprising the electrolyte membrane of claim 1.

17. An electrolyte membrane, comprising:
a porous support comprising pores;
a first ionomer layer comprising a first ionomer solution penetrating into the pores from a first surface of the porous support; and
a second ionomer layer comprising a second ionomer solution penetrating into the pores from a second surface of the porous support opposite the first surface,
wherein a viscosity of the first ionomer solution is different from a viscosity of the second ionomer solution, and the first ionomer and the second ionomer comprise a same kind ionomer.

* * * * *